United States Patent
Alam et al.

(10) Patent No.: US 9,931,944 B2
(45) Date of Patent: Apr. 3, 2018

(54) VARIABLE VOLTAGE CONVERT SYSTEM WITH REDUCED BYPASS DIODE CONDUCTION

(71) Applicant: Ford Global Technologies, LLC, Dearborn, MI (US)

(72) Inventors: Mohammed Khorshed Alam, Dearborn, MI (US); Lihua Chen, Northville, MI (US); Yan Zhou, Canton, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 15/077,495

(22) Filed: Mar. 22, 2016

(65) Prior Publication Data

US 2017/0274777 A1    Sep. 28, 2017

(51) Int. Cl.
| | |
|---|---|
| *B60L 1/00* | (2006.01) |
| *B60L 3/00* | (2006.01) |
| *H02G 3/00* | (2006.01) |
| *B60L 11/02* | (2006.01) |
| *B60L 11/18* | (2006.01) |
| *H02M 3/158* | (2006.01) |
| *H02M 7/533* | (2006.01) |

(52) U.S. Cl.
CPC ........... *B60L 11/02* (2013.01); *B60L 11/1814* (2013.01); *H02M 3/158* (2013.01); *H02M 7/533* (2013.01)

(58) Field of Classification Search
USPC .......................................... 307/10.1, 45, 46
See application file for complete search history.

(56) References Cited

U.S. PATENT DOCUMENTS

| | | | | |
|---|---|---|---|---|
| 8,026,638 B2* | 9/2011 | King | .................. | B60L 11/1861 307/45 |
| 8,456,138 B2* | 6/2013 | Lei | ......... | H05B 41/28 322/24 |
| 8,760,891 B2* | 6/2014 | Lloyd | .................. | H03K 17/18 363/56.04 |
| 9,000,614 B2* | 4/2015 | King | ..................... | B60L 11/005 307/45 |
| 9,444,448 B2* | 9/2016 | Wagoner | ........... | H03K 17/0412 |
| 9,537,445 B2* | 1/2017 | Adest | ................ | H01L 31/02021 |
| 9,543,942 B2* | 1/2017 | Sicard | ................. | H03K 17/168 |
| 9,550,434 B2* | 1/2017 | King | ................. | B60L 11/1868 |
| 9,553,540 B2* | 1/2017 | Degner | ............. | H02M 7/53875 |
| 9,573,474 B2* | 2/2017 | Mensah-Brown | .... | B60L 11/005 |
| 9,641,102 B2* | 5/2017 | Mitamura | ........... | H01L 27/0664 |
| 9,783,184 B2* | 10/2017 | Nagata | .................. | B60W 20/00 |

(Continued)

FOREIGN PATENT DOCUMENTS

EP      2410648 A1     1/2012

*Primary Examiner* — Adam Houston
(74) *Attorney, Agent, or Firm* — David B. Kelley; Brooks Kushman P.C.

(57) ABSTRACT

A vehicle powertrain includes a bypass diode and a controller. The bypass diode is configured to clamp an inverter DC terminal voltage to a battery voltage. The controller is configured to, while the terminal voltage is within a predetermined range of the battery voltage, maintain off a lower IGBT of a DC-DC converter while in a propulsion mode, and modulate the lower IGBT to increase the terminal voltage to maintain the bypass diode reverse biased while in a regenerative mode.

20 Claims, 9 Drawing Sheets

(56) References Cited

U.S. PATENT DOCUMENTS

| | | | |
|---|---|---|---|
| 9,785,172 B2 * | 10/2017 | Agarwal | H02M 3/07 |
| 9,809,128 B2 * | 11/2017 | Berry | B60L 11/1877 |
| 9,810,742 B2 * | 11/2017 | Giordano | G01R 31/3278 |
| 2006/0152180 A1 | 7/2006 | Tahara et al. | |
| 2012/0019231 A1 | 1/2012 | Chen | |
| 2013/0245869 A1 | 9/2013 | Nishida et al. | |

* cited by examiner

US 9,931,944 B2

VARIABLE VOLTAGE CONVERT SYSTEM WITH REDUCED BYPASS DIODE CONDUCTION

TECHNICAL FIELD

This application is generally related to control of IGBTs in a DC-DC converter with a bypass diode for a hybrid-electric powertrain.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range. The terminal voltage of a typical traction battery is over 100 Volts DC and the traction battery is alternatively referred to as a high-voltage battery. However, improved performance of electric machines may be achieved by operating in a different voltage range, typically at higher voltages than the traction battery. Many electrified vehicles include a DC-DC converter also referred to as a variable voltage converter (VVC) to convert the voltage of the traction battery to an operational voltage level of the electric machine. The electric machine that may include a traction motor may require a high voltage and high current. Due to the voltage, current and switching requirements, an Insulated Gate Bipolar junction Transistor (IGBT) is typically used to generate the signals in the power inverter and the VVC.

SUMMARY

A vehicle powertrain includes a bypass diode and a controller. The bypass diode is configured to clamp an inverter DC terminal voltage to a battery voltage. The controller is configured to, while the terminal voltage is within a predetermined range of the battery voltage, maintain off a lower IGBT of a DC-DC converter while in a propulsion mode, and modulate the lower IGBT to increase the terminal voltage to maintain the bypass diode reverse biased while in a regenerative mode.

A method of operating a DC-DC converter of a vehicle powertrain while a bus voltage is within a predetermined range of a battery voltage includes maintaining in an on state an upper IGBT to enhance a channel from a battery to a load while in a propulsion mode, and modulating the upper IGBT to increase a current fluctuation magnitude through an inductor of the converter to reverse bias a converter bypass diode.

A vehicle powertrain includes a boost converter coupling a battery with an inverter, a bypass diode configured to clamp an inverter DC terminal voltage to a battery voltage; and a controller. The controller is configured to, while operating the powertrain in a regenerative mode, modulate IGBTs of the boost converter to increase a current fluctuation magnitude through an inductor of the boost converter to shutoff the bypass diode by increasing an average of the inverter DC terminal voltage.

BRIEF DESCRIPTION OF THE DRAWINGS

FIG. 4A is a graphical representation of a bypass diode current and a battery current with respect to time while the high-side IGBT of the VVC is on.

FIG. 4B is a graphical representation of an inductor current and an input capacitor current with respect to time while the high-side IGBT of the VVC is on.

FIG. 5A is a graphical representation of a battery voltage and a DC link voltage with respect to time while the high-side IGBT of the VVC is on.

DETAILED DESCRIPTION

Figure 1:
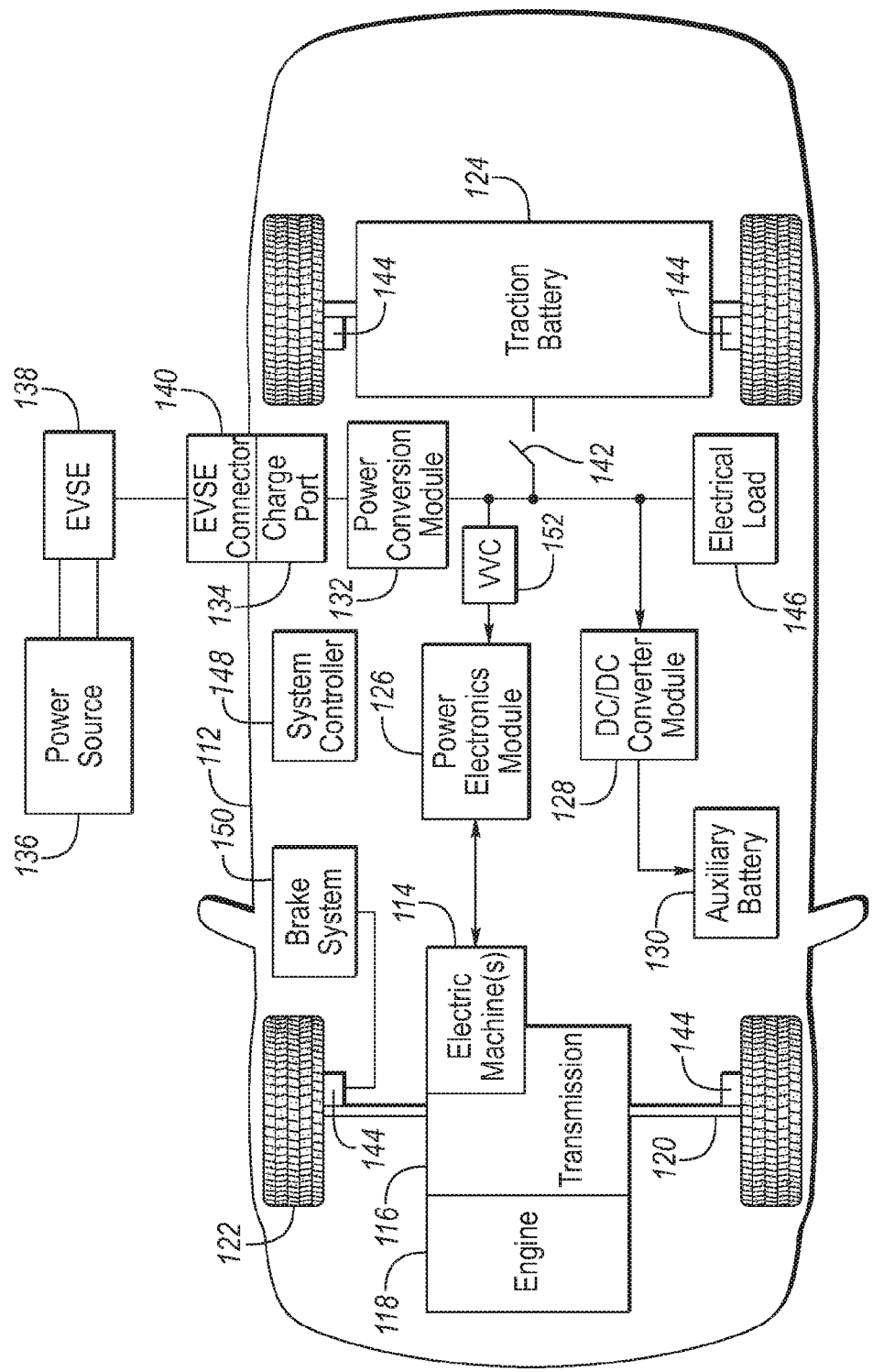
FIG. 1 is a diagram of a hybrid vehicle illustrating typical drivetrain and energy storage components with a power inverter therebetween.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles (HEVs) such as battery electric vehicles (BEVs) and plug-in hybrid electric vehicles (PHEVs) typically are configured with at least one electric machine. When multiple electric machines are used in a powertrain of a HEV, each electric machine is typically coupled with a power inverter. When in a propulsion mode, the power inverter converts DC power from a traction battery to AC power used by the electric machine. Alternatively, when in a regeneration mode, the power inverter converts AC power from the electric machine to DC power to be stored by the traction battery. The use of two electric machines, each coupled with a power inverter is applicable to series hybrid systems, parallel hybrid systems and series-parallel hybrid systems also referred to as power split hybrid systems. A variable voltage converter (VVC) is a bi-directional boost/buck DC-DC converter used for controlling the DC-link voltage to minimize the traction inverter losses. The VVC controls the supply voltage of the power inverters, also referred to as DC-link voltage or DC-bus voltage, by boosting a lower voltage (e.g., traction battery voltage) to a higher voltage (e.g., supply voltage) when in a propulsion mode. When in a regenerative mode, the VVC bucks the higher voltage (e.g., supply voltage) to a lower voltage (e.g., traction battery voltage). However, when the electric machine is operated at a voltage approximately equal to the traction battery, the VVC may operate in a bypass or pass-through mode. During the pass-through mode of the VVC, the upper IGBT is turned on and held on, at the same time as the lower IGBT is turned off and held off. A bypass diode is placed between the battery positive terminal and the DC-link positive terminal to reduce the VVC losses during pass-through mode. The bypass diode can significantly reduce the VVC losses during pass-through mode when the battery discharges. However, when the battery is being charged due to a regenerative operation of the vehicle, the bypass diode may turn ON due to oscillation in the DC link voltage. This oscillation results in additional losses in the VVC due to energy flowing back to inverter from the battery and input capacitor (Ci) through the bypass diode and the circulating current between the inductor and the bypass diode.

Here, a control strategy that modulates the upper and lower IGBTs of the VVC is presented to reduce the losses due to the circulation of energy through the bypass diode during vehicle regenerative operations. For example, when operating under this proposed strategy, the controller may be configured to modulate the IGBTs at a frequency approximately ½ of the operating frequency such that the controller turns on the upper IGBT and turns off the lower IGBT 95% of the time, and turns off the upper IGBT and turns on the lower IGBT 5% of the time. In an alternative embodiment, the controller may be configured to modulate the IGBTs at a frequency approximately ¼ of the operating frequency such that the controller turns on the upper IGBT and turns off the lower IGBT 90% of the time, and turns off the upper IGBT and turns on the lower IGBT 10% of the time. In a further embodiment, the controller may be configured to modulate the IGBTs at a variable frequency that may be less than ¾ of the operating frequency such that the controller turns on the upper IGBT and turns off the lower IGBT 98% of the time, and turns off the upper IGBT and turns on the lower IGBT 2% of the time FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
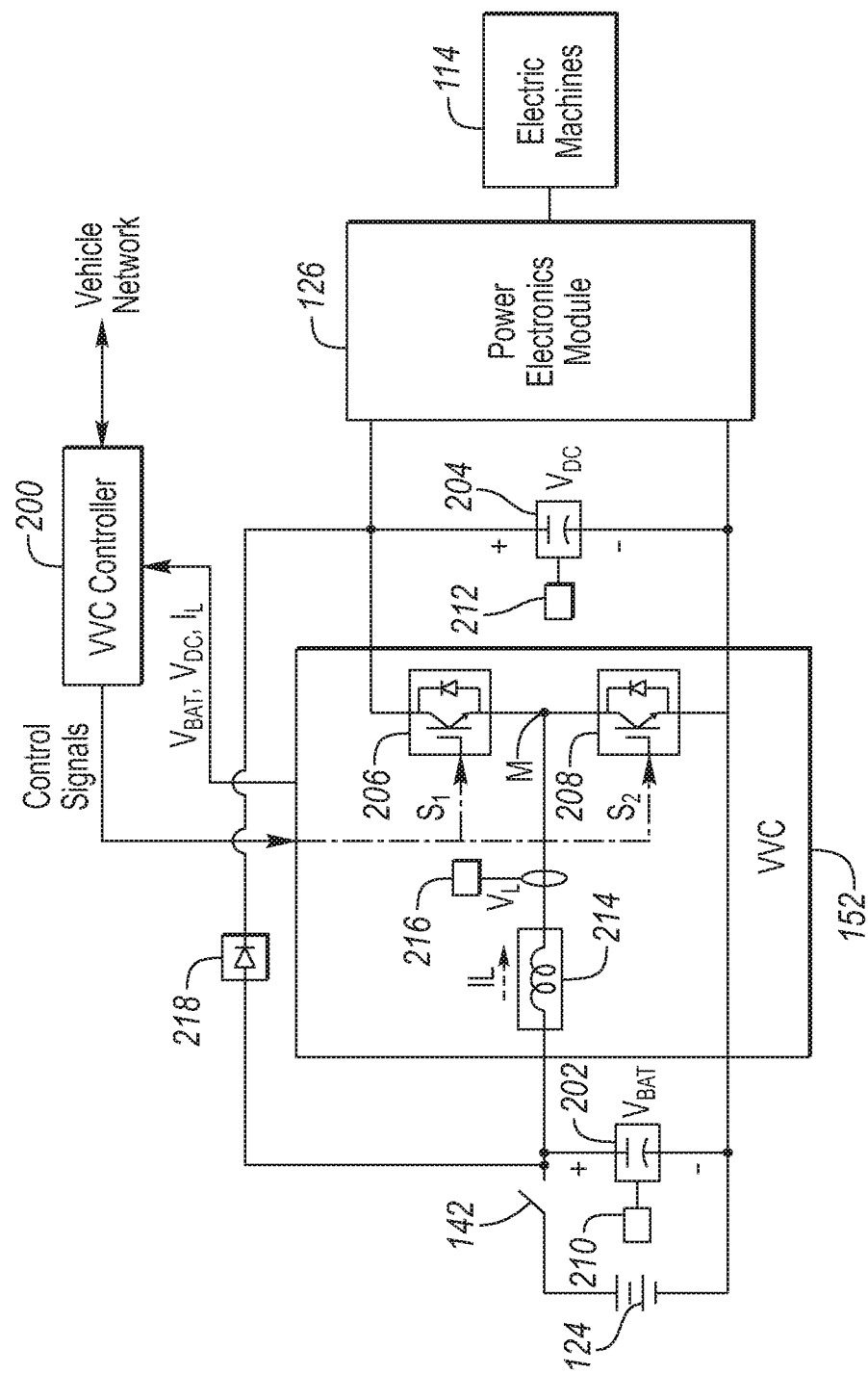
FIG. 2 is a schematic diagram of a vehicular variable voltage converter (VVC).

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated in a boost mode to cause a voltage at the output terminals to be greater than a voltage at the input terminals. The VVC 152 may be operated in a buck mode to cause a voltage at the output terminals to be less than a voltage at the input terminals. The VVC 152 may be operated in a bypass mode to cause a voltage at the output terminals to be approximately equal to a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \qquad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. High voltage is any voltage greater than 100 Volts DC or 100 Volts AC. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216. In another embodiment, a bypass diode 218 may be coupled between the input of the VVC and the output of the VVC such that the output of the VVC (e.g., inverter input voltage) is clamped to the input voltage of the VVC (e.g., the traction battery voltage).

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}, V_{dc}, I_L, V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208).

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current as illustrated in FIG. 4. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the voltage converter 152.

When operating the VVC in a regenerative bypass mode to flow a current from the PEM 126 to the traction battery 124, traditionally the upper IGBT 206 is turned on allowing a conduction path from the PEM 126 to the inductor 214 while the lower IGBT 208 is turned off, disconnecting the upper IGBT 206 from the system ground. The IGBTs (206, 208) are maintained in their respective state (e.g., when upper IGBT 206 is on and lower IGBT 208 is off) while in regenerative bypass mode. While in a regenerative mode, current flows from the PEM 126 to the battery 124 when the voltage across the PEM 126 is slightly greater than or approximately equal to the voltage of the battery 124.

During regenerative bypass mode, fluctuations of the DC-link voltage may result in the voltage at the PEM 126 to drop below the voltage of the battery 124. This fluctuation may cause the bypass diode 218 to conduct and flow current. When the VVC is operating in this condition, a current loop is formed in which a current flows from the positive terminal of the battery 124 through the bypass diode 218 to the terminal of the collector of the upper IGBT 206, through the upper IGBT 206, through the inductor 214 to the positive terminal of the battery 124. This current loop is also referred to as a ripple current through the bypass diode.

There may be some undesired losses incurred in the bypass diode when turned ON due to the ripple current flowing through the bypass diode. The ripple current through the bypass diode is supplied by the input capacitor 202 and the battery 124. Therefore, additional losses are due to an ESR of the input capacitor 202 and an ESR of the battery 124. Another source of the ripple current through the bypass diode is the VVC inductor 214. When the DC-link voltage fluctuates, the inductor 214 may freewheel current through the bypass diode. The freewheeled current through the inductor 214 results in undesired current circulation through the bypass diode 218 and results in additional losses in the ESR of the inductor 214. To reduce, and in some cases eliminate, the ripple current in the bypass diode 218, the upper IGBT 206 and lower IGBT 208 may be modulated.

Figure 3:
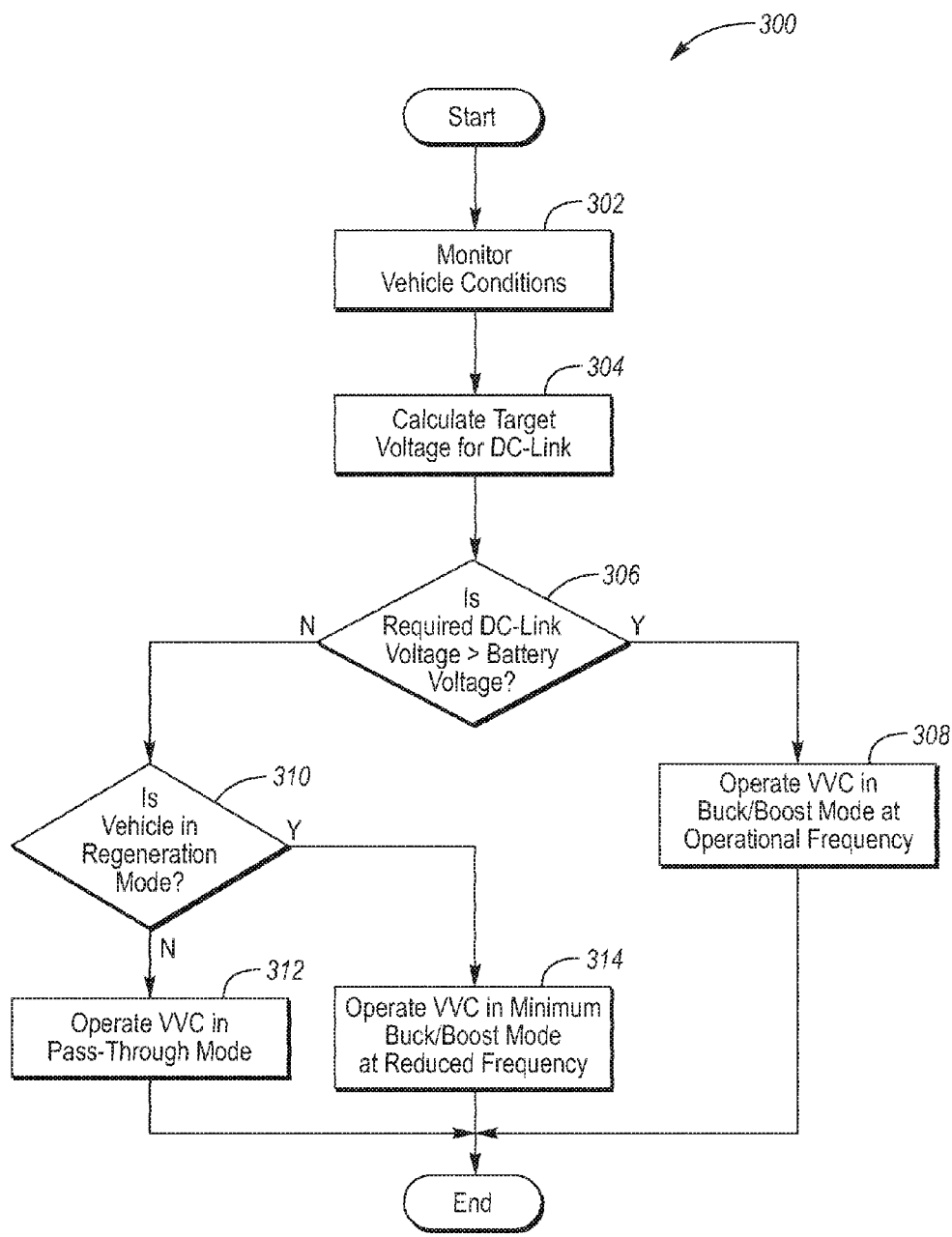
FIG. 3 is a flow diagram of a VVC control system.

FIG. 3 is a flow diagram of a VVC control system 300 used to modulate the upper IGBT 206 and lower IGBT 208. In operation 302, a controller monitors vehicle conditions. The vehicle conditions include a rotational speed of an electric machine, a vehicle power demand, a speed of the vehicle, an inclination of the vehicle, a temperature of VVC components, and a historical drive pattern of the vehicle. In operation 304, a controller, based on the vehicle conditions, calculates a target DC-link voltage. When the powertrain is operating in a regenerative mode, the target DC-link voltage is the output from the PEM 126 and is the input to the VVC 152.

In operation 306, the controller compares the target DC-link voltage with the battery voltage. If the target DC-link voltage is greater than the battery voltage, the controller will branch to operation 308. If the target DC-link voltage is less than or equal to the battery voltage, the controller will branch to operation 310. In an alternative embodiment, the controller in operation 306 may branch to operation 308 if the target DC-link voltage is greater than the battery voltage by a predetermined amount, and branch to operation 310 if the target DC-link voltage is within the predetermined amount or within a predetermined range of the battery voltage, for example, within 10 volts, or 25 volts.

In operation 308, the controller will operate the VVC in a boost or buck mode depending upon if the powertrain is propelling the vehicle or in a regenerative mode. If the powertrain is operating in a propulsion mode, the controller operates the VVC in a boost mode to boost the battery voltage to the higher DC-link voltage. If the powertrain is operating in a regenerative mode, the controller operates the VVC in a buck mode to reduce the DC-link voltage to the battery voltage.

In operation 310, the controller branches to operation 312 if the vehicle is in a propulsion mode and the controller branches to operation 314 if the vehicle is in a regeneration mode. In operation 312, the controller will turn on the upper IGBT (e.g., IGBT 206) and turn off the lower IGBT (e.g., IGBT 208) and maintain the IGBTs (e.g., IGBTs 206 and 208) in that state to pass power through the VVC (e.g., VVC 152). During this operation, the IGBTs are operated statically to provide the pass through channel. This allows the electric machine (e.g., electric machine 114) and inverter to operate at the battery voltage. To further improve operation in this mode, a bypass diode (e.g., bypass diode 218) is used to provide a current path from the traction battery to the inverter (e.g., PEM 126). This bypass diode allows power to bypass the VVC providing a current path from the traction battery to the inverter. The bypass diode has lower losses than the losses associated with the VVC when operated in the pass-through mode also referred to as the bypass mode. Traditionally, when the DC-link voltage and the battery voltage are within a predetermined range, (e.g., 5 volts, 10 volts, or 25 volts) the IGBTs are turned on and maintained on when the powertrain is operated in both a propulsion mode and a regenerative mode. Here, in operation 314, the controller will modulate the IGBTs of the VVC when in the regenerative mode. By modulating the IGBTs while the powertrain is in a regeneration mode, the DC-link voltage is increased such that the bypass diode (e.g., bypass diode 218) is maintained in a reverse bias mode and a channel through the bypass diode is shut off. This reduces the associated losses due to recirculating currents through the bypass diode and the VVC in pass-through mode. The advantages are illustrated in FIGS. 4A-6B that illustrate the voltages and currents of associated components when the VVC is operated statically in a pass-through mode and dynamically when the VVC is operated by modulating the IGBTs. The dynamic operation may be at a frequency less than the operation frequency of the VVC to minimize losses. In some embodiments, the frequency may be a variable frequency. For example, the frequency may be varied between ½ of the operational frequency and ¼ of the operational frequency.

Figure 4A:
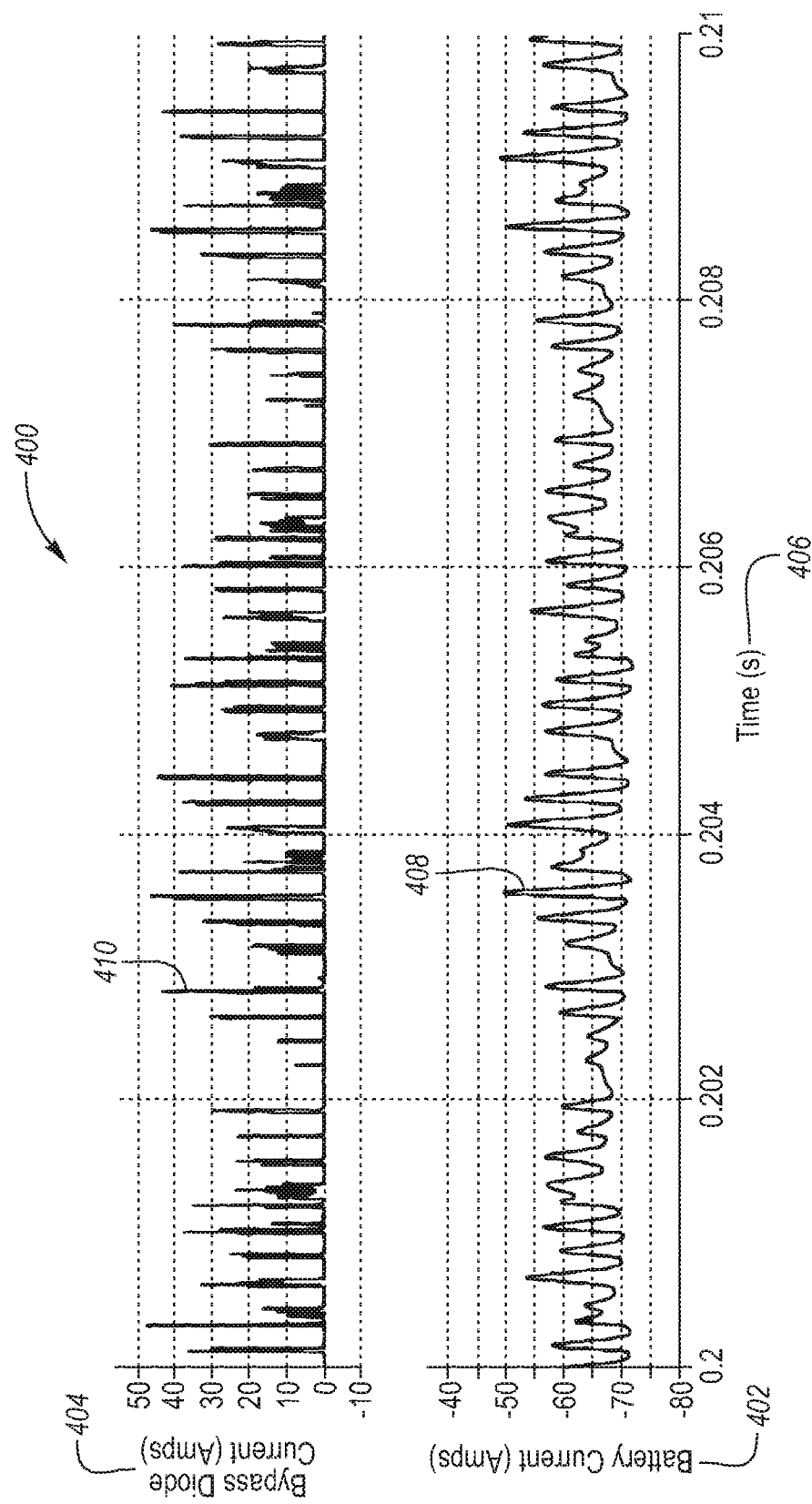

FIG. 4A is a graphical representation 400 of a bypass diode current 404 and battery current 402 with respect to time 406 while the high-side IGBT of the VVC is on. Typically, the VVC is operated such that the bypass diode current profile 410 has current spikes over 40 amps when the VVC is operated in a regeneration mode maintaining the upper IGBT on. While an associated battery current profile 408 fluctuates from approximately −50 amps to −73 amps when the VVC is operated in a regeneration mode maintaining the upper IGBT on. The negative number is an indication that the current is flowing to the battery.

Figure 4B:
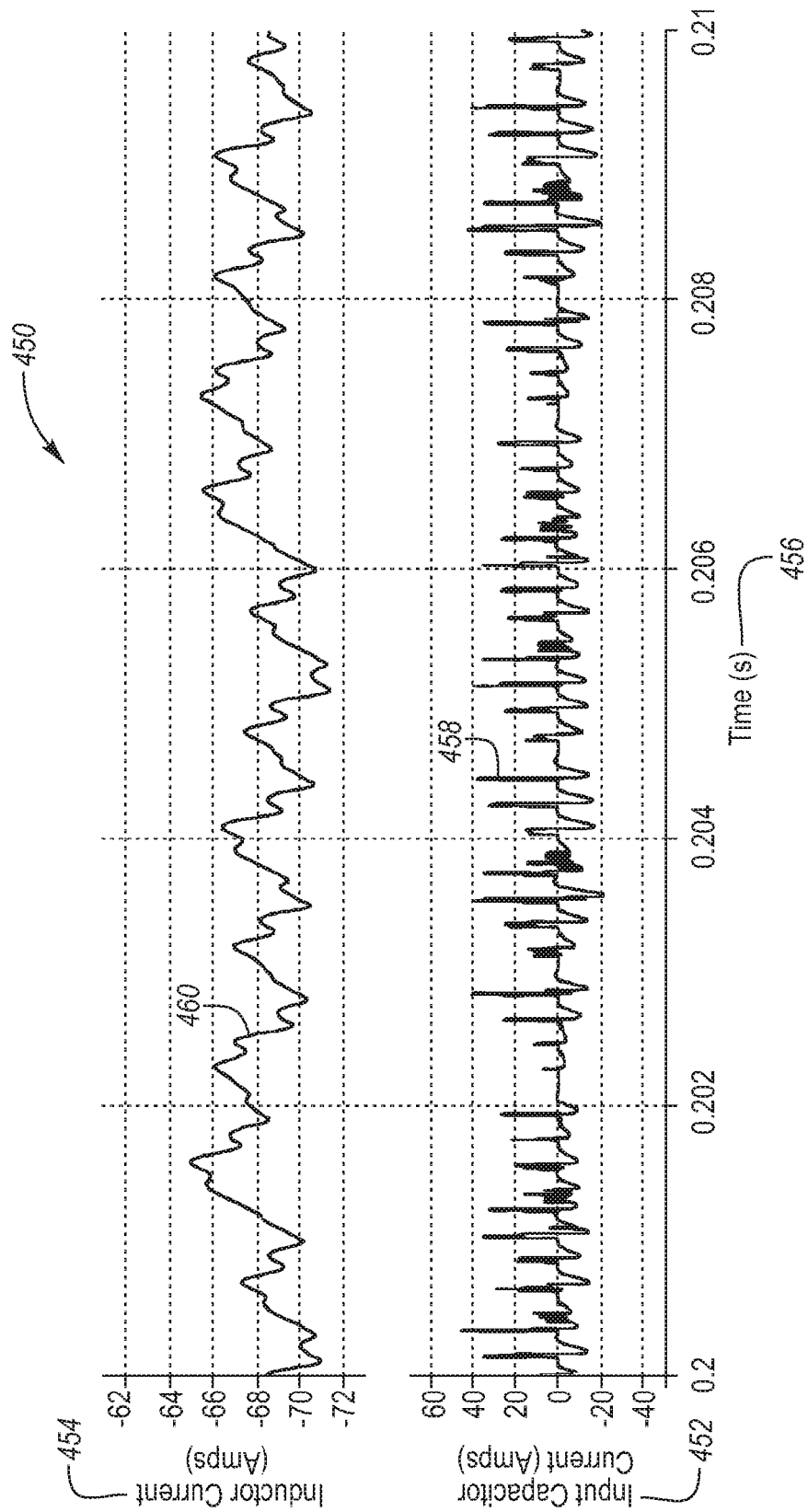

FIG. 4B is a graphical representation 450 of an inductor current 454 and input capacitor current 452 with respect to time 456 while the high-side IGBT of the VVC is on. The typical inductor current profile 460 fluctuates between −65 amps and −71 amps with an average current of −68 amps when the VVC is operated in a regeneration mode while maintaining the upper IGBT on. While the input capacitor profile 458 fluctuates between −20 amps and −42 amps when the VVC is operated in a regeneration mode while maintaining the upper IGBT on.

Figure 5A:
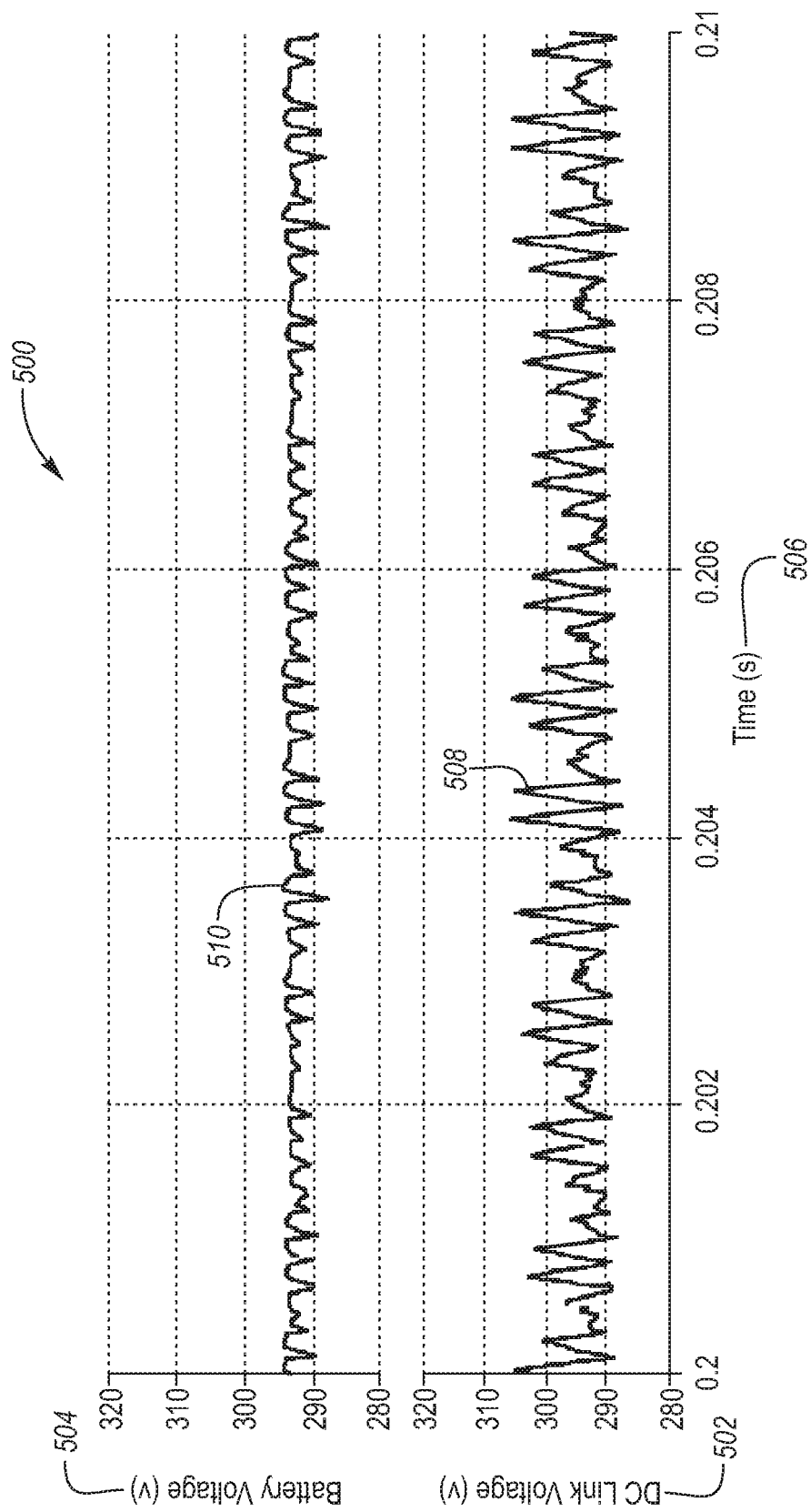

FIG. 5A is a graphical representation 500 of a battery voltage 504 and DC link voltage 502 with respect to time 506 while the high-side IGBT of the VVC is on. When the VVC is operated in a regeneration mode maintaining the upper IGBT on, the battery voltage profile 510 fluctuates between 288 volts and 295 volts with an average of approximately 293 volts. The DC-link voltage profile 508 fluctuates between 286 volts and 304 volts with an average of 295 volts, roughly different from the battery voltage by the saturation voltage of the IGBT and the voltage drop across the inductor.

Figure 5B:
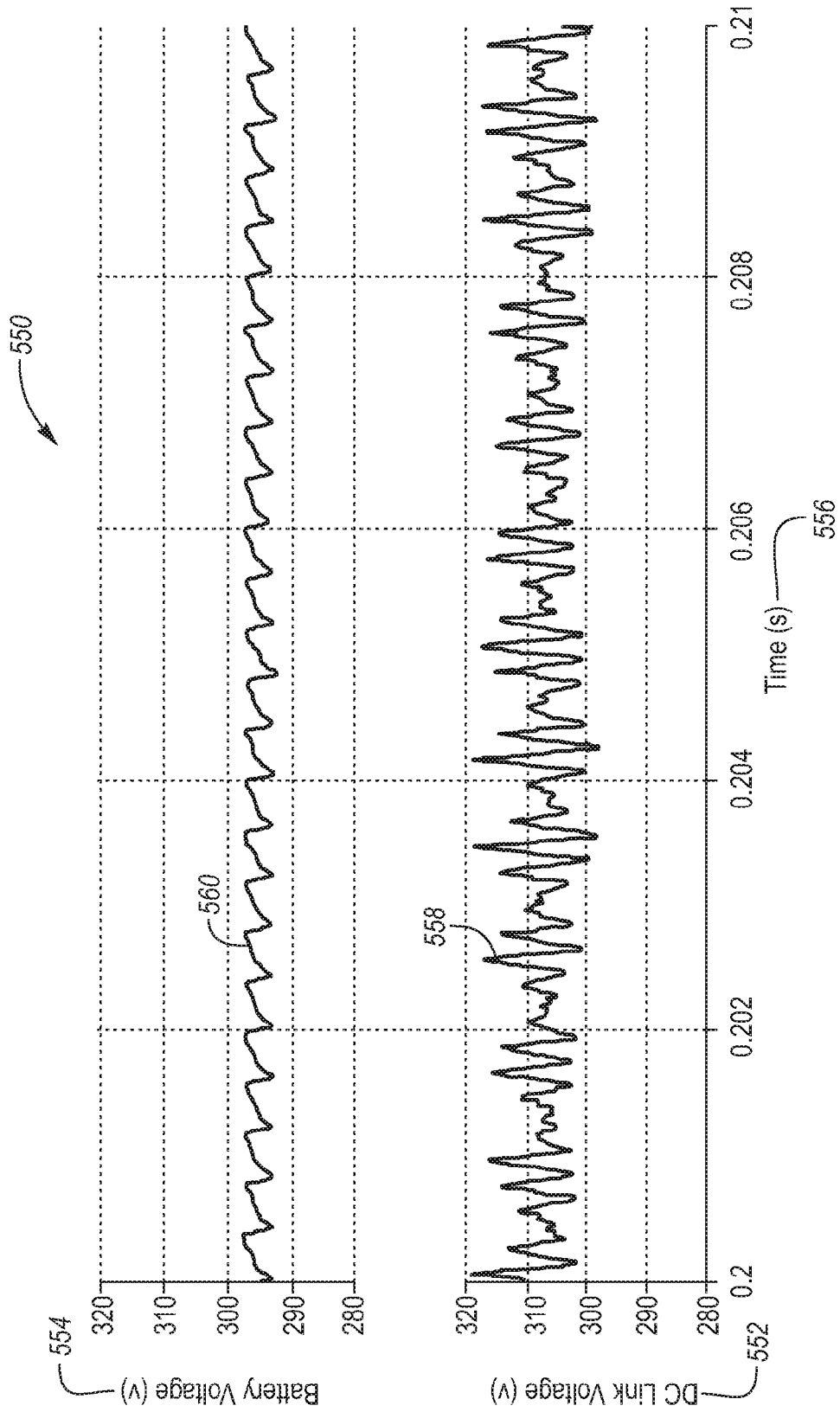
FIG. 5B is a graphical representation of a battery voltage and a DC link voltage with respect to time while modulating the IGBTs of the VVC.

FIG. 5B is a graphical representation 550 of a battery voltage 554 and DC link voltage 552 with respect to time 556 while modulating the IGBTs of the VVC. When the VVC is operated in a regeneration mode and the controller modulates the IGBTs of the VVC, the battery voltage profile 560 fluctuates between 292 volts and 298 volts with an average of approximately 295 volts. While the DC-link voltage profile 558 fluctuates between approximately 300 volts and 320 volts with an average of 309 volts. When comparing the operation between typical operation as shown in FIG. 5A and operation that modulates the IGBTs, the fluctuations of the battery voltage is shown to be reduced while the DC-link voltage is shown to be maintained above the battery voltage, thus maintaining the bypass diode in a reverse bias state such that current flow through the bypass diode is turned off.

Figure 6A:
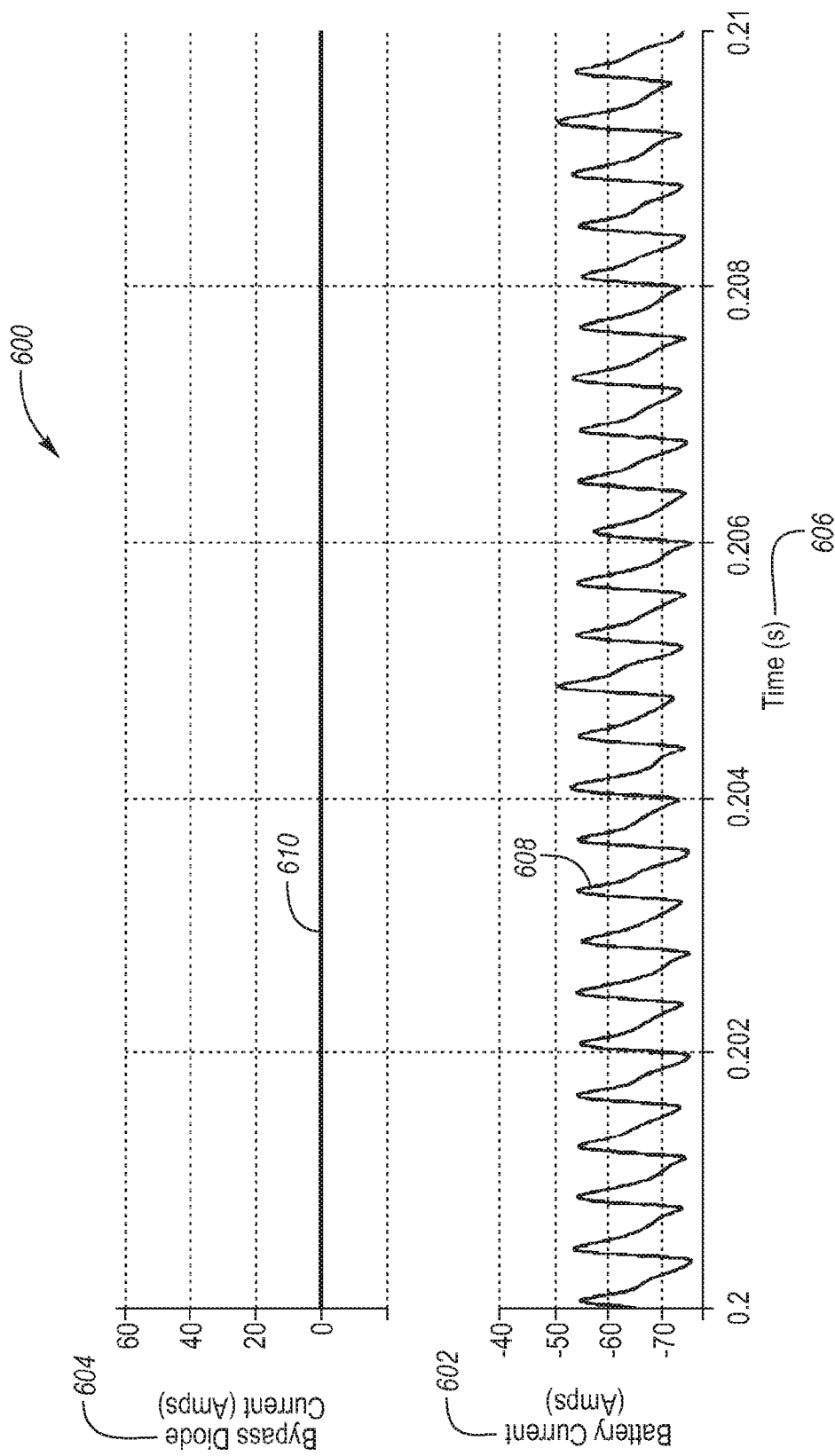
FIG. 6A is a graphical representation of a bypass diode current and a battery current with respect to time while modulating the IGBTs of the VVC.

FIG. 6A is a graphical representation 600 of a bypass diode current 604 and battery current 602 with respect to time 606 while modulating the IGBTs of the VVC. When the VVC is operated in a regeneration mode and the controller modulates the IGBTs of the VVC, the bypass diode current profile 610 is shown to have no current spikes as the diode is reverse biased unlike in FIG. 4A. While an associated battery current profile 608 fluctuates between approximately −50 amps to −77 amps. When comparing the operation between typical operation as shown in FIG. 4A and operation that modulates the IGBTs, maintaining the reverse bias of the bypass diode is shown to eliminate the fluctuations of the bypass diode current while slightly increasing the fluctuations of the battery current.

Figure 6B:
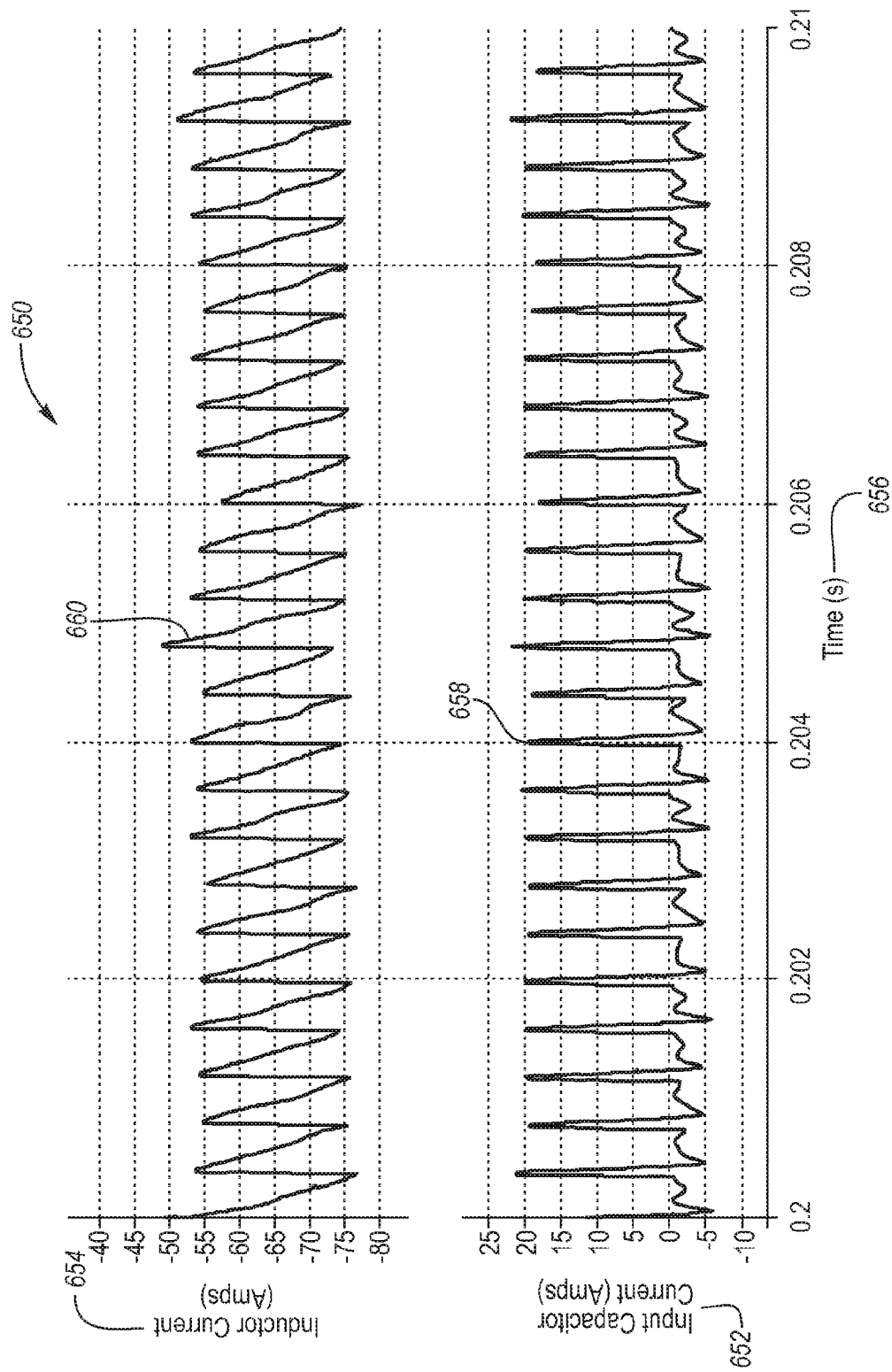
FIG. 6B is a graphical representation of an inductor current and a input capacitor current with respect to time while modulating the IGBTs of the VVC.

FIG. 6B is a graphical representation 650 of an inductor current 654 and input capacitor current 652 with respect to time 656 while modulating the IGBTs of the VVC. When the VVC is operated in a regeneration mode and the controller modulates the IGBTs of the VVC, the inductor current profile 660 fluctuates between approximately −50 amps and −77 amps with an average inductor current of −65 amps unlike in FIG. 4B. Here, by modulating the IGBTs while the VVC is in regenerative mode, the fluctuations are shown to have increased while the average current decreased. Also, when the VVC is operated in a regeneration mode and the controller modulates the IGBTs of the VVC, the input capacitor is shown to have a current profile 652 that fluctuates between approximately −5 amps to 23 amps. Here, the current fluctuations of the input capacitor is decreased from a range of over 60 amps when the IGBTs are held in a static state in regenerative mode, to less than 30 amps when the controller modulates the IGBTs in the regenerative mode.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   a bypass diode configured to clamp an inverter DC terminal voltage to a battery voltage; and
   a controller configured to, while the terminal voltage is within a predetermined range of the battery voltage, maintain off a lower IGBT of a DC-DC converter while in a propulsion mode, and modulate the lower IGBT to increase the terminal voltage to maintain the bypass diode reverse biased while in a regenerative mode.

2. The vehicle powertrain of claim 1, wherein the controller is further configured to modulate the lower IGBT and an upper IGBT of the DC-DC converter at a regenerative frequency that is less than an operating frequency.

3. The vehicle powertrain of claim 2, wherein the operating frequency of the converter is at least 5 kHz, and the regenerative frequency is no more than 2.5 kHz.

4. The vehicle powertrain of claim 3, wherein the IGBTs are modulated such that an on-time percentage of the lower IGBT is greater than a 2% PWM duty cycle.

5. The vehicle powertrain of claim 3, wherein the IGBTs are modulated at a PWM duty cycle in which the lower IGBT on-time percentage increases as the regenerative frequency decreases.

6. The vehicle powertrain of claim 1 further comprising an electric machine, and wherein the controller is further configured to, in response to a rotational speed of the electric machine decreasing below a minimum speed limit, while operating in the regenerative mode, modulate the lower IGBT and an upper IGBT of the DC-DC converter to boost the terminal voltage to at least the battery voltage.

7. The vehicle powertrain of claim 1, wherein the modulation of the lower IGBT increases a current fluctuation magnitude through an inductor of the converter to increase the inverter DC terminal voltage to reverse bias the bypass diode.

8. A method of operating a DC-DC converter of a vehicle powertrain comprising:
   while a bus voltage is within a predetermined range of a battery voltage, by a controller
      maintaining in an on state an upper IGBT to enhance a channel from a battery to a load while in a propulsion mode; and
      modulating the upper IGBT to increase a current fluctuation magnitude through an inductor of the converter to reverse bias a converter bypass diode.

9. The method of claim 8 further comprising modulating a lower IGBT inversely to the upper IGBT such that the lower IGBT on-time percentage is greater than 2%.

10. The method of claim 8, wherein the upper IGBT is modulated such that the upper IGBT off-time percentage is greater than 2%.

11. The method of claim 8, wherein the predetermined range is within 25 volts.

12. The method of claim 8, wherein the modulation is at a regenerative frequency that is less than an operating frequency.

13. The method of claim 12, wherein the regenerative frequency is less than half of the operating frequency.

14. A vehicle powertrain comprising:
    a boost converter coupling a battery with an inverter;
    a bypass diode configured to clamp an inverter DC terminal voltage to a battery voltage; and
    a controller configured to, while operating the powertrain in a regenerative mode, modulate IGBTs of the boost converter to increase a current fluctuation magnitude through an inductor of the boost converter to shutoff the bypass diode by increasing an average of the inverter DC terminal voltage.

15. The vehicle powertrain of claim 14, wherein the controller is further configured to modulate the IGBTs of the boost converter to decrease a voltage fluctuation across an input capacitor of the boost converter to shutoff the bypass diode by increasing an average of the inverter DC terminal voltage.

16. The vehicle powertrain of claim 14, wherein the controller is configured to, when the DC terminal voltage is within a predetermined range of the battery voltage, turn on an upper IGBT and turn off a lower IGBT when the powertrain is in a propulsion mode, and modulate the upper IGBT and lower IGBT when the powertrain is in a regeneration mode.

17. The vehicle powertrain of claim 16, wherein the predetermined range is within 25 volts.

18. The vehicle powertrain of claim 14, wherein the controller is further configured to modulate the lower IGBT and an upper IGBT of the boost converter at a regenerative frequency that is less than an operating frequency.

19. The vehicle powertrain of claim 18, wherein the operating frequency of the boost converter is at least 5 kHz, and the regenerative frequency is no more than 2.5 kHz.

20. The vehicle powertrain of claim 19, wherein the IGBTs are modulated such that an on-time percentage of the lower IGBT is greater than a 2% PWM duty cycle.

* * * * *